United States Patent
Lu et al.

(10) Patent No.: US 9,718,266 B2
(45) Date of Patent: Aug. 1, 2017

(54) LABEL AFFIXING MACHINE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Li-Chin Lu, New Taipei (TW); Jian-Hua Xiang, Shenzhen (CN); Liu-Jun Kong, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 103 days.

(21) Appl. No.: 14/729,383

(22) Filed: Jun. 3, 2015

(65) Prior Publication Data

US 2016/0214366 A1 Jul. 28, 2016

(30) Foreign Application Priority Data

Jan. 22, 2015 (CN) .......................... 2015 1 0030351

(51) Int. Cl.
*B32B 38/10* (2006.01)
*B32B 43/00* (2006.01)
*B65C 9/00* (2006.01)
*B65C 1/02* (2006.01)

(52) U.S. Cl.
CPC ............ *B32B 43/006* (2013.01); *B65C 1/023* (2013.01); *B65C 9/0006* (2013.01); *B32B 38/10* (2013.01); *Y10T 156/11* (2015.01); *Y10T 156/1132* (2015.01); *Y10T 156/1168* (2015.01); *Y10T 156/1195* (2015.01); *Y10T 156/19* (2015.01); *Y10T 156/1944* (2015.01); *Y10T 156/1994* (2015.01)

(58) Field of Classification Search
CPC ..... B32B 43/006; B32B 38/10; Y10T 156/11; Y10T 156/1132; Y10T 156/1168; Y10T 156/1195; Y10T 156/19; Y10T 156/1944; Y10T 156/1994
USPC ........ 156/701, 707, 714, 719, 750, 758, 767
See application file for complete search history.

(56) References Cited

U.S. PATENT DOCUMENTS 4,725,327 A * 2/1988 Matuda .................. B65C 1/021
156/351
5,865,918 A * 2/1999 Franklin ............... B65C 9/1826
156/363

(Continued)

*Primary Examiner* — Mark A Osele
*Assistant Examiner* — Nickolas Harm
(74) *Attorney, Agent, or Firm* — Steven Reiss

(57) ABSTRACT

A label affixing machine includes a holder, a storing device, a storing device, a peeling device and a conveyer. The storing device, the peeling device and the conveyer are fixed in position on the holder. The picking device is coupled to the conveyer. The label includes a bottom board affixed under the label, the label affixing machine configured to affix the label on an object. The picking device is configured for picking the label. The peeling device includes a second fixing module fixed in position on the holder, a second moving module coupled to the second fixing module and a robotic arm fixed in position on the second moving module. The robotic arm is configured for clamping the bottom board and peeling the bottom board from the label. The conveyer moves the picking device and affixes the label on the object.

20 Claims, 9 Drawing Sheets

(56) References Cited

U.S. PATENT DOCUMENTS

| | | | | |
|---|---|---|---|---|
| 6,080,250 | A * | 6/2000 | Urban | B65C 9/1884 |
| | | | | 156/360 |
| 7,650,691 | B2 * | 1/2010 | Narita | H01L 21/67132 |
| | | | | 29/740 |
| 7,765,776 | B1 * | 8/2010 | Leu | B65B 5/045 |
| | | | | 53/131.4 |
| 2007/0107572 | A1 * | 5/2007 | Pommier | A41H 43/0292 |
| | | | | 83/29 |
| 2008/0085658 | A1 * | 4/2008 | Katsuoka | B24B 37/04 |
| | | | | 451/7 |
| 2009/0107633 | A1 * | 4/2009 | Yamaguchi | B65H 5/06 |
| | | | | 156/716 |
| 2013/0065353 | A1 * | 3/2013 | Albrecht | B32B 17/10036 |
| | | | | 438/73 |

\* cited by examiner

LABEL AFFIXING MACHINE

CROSS-REFERENCE TO RELATED APPLICATIONS

This application claims priority to Chinese Patent Application No. 201510030351.1 filed on Jan. 22, 2015, the contents of which are incorporated by reference herein.

FIELD

The disclosure generally relates to label affixing machines for affixing labels on objects.

BACKGROUND

Labels are usually attached to various products by manual labor and at high cost.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 1:
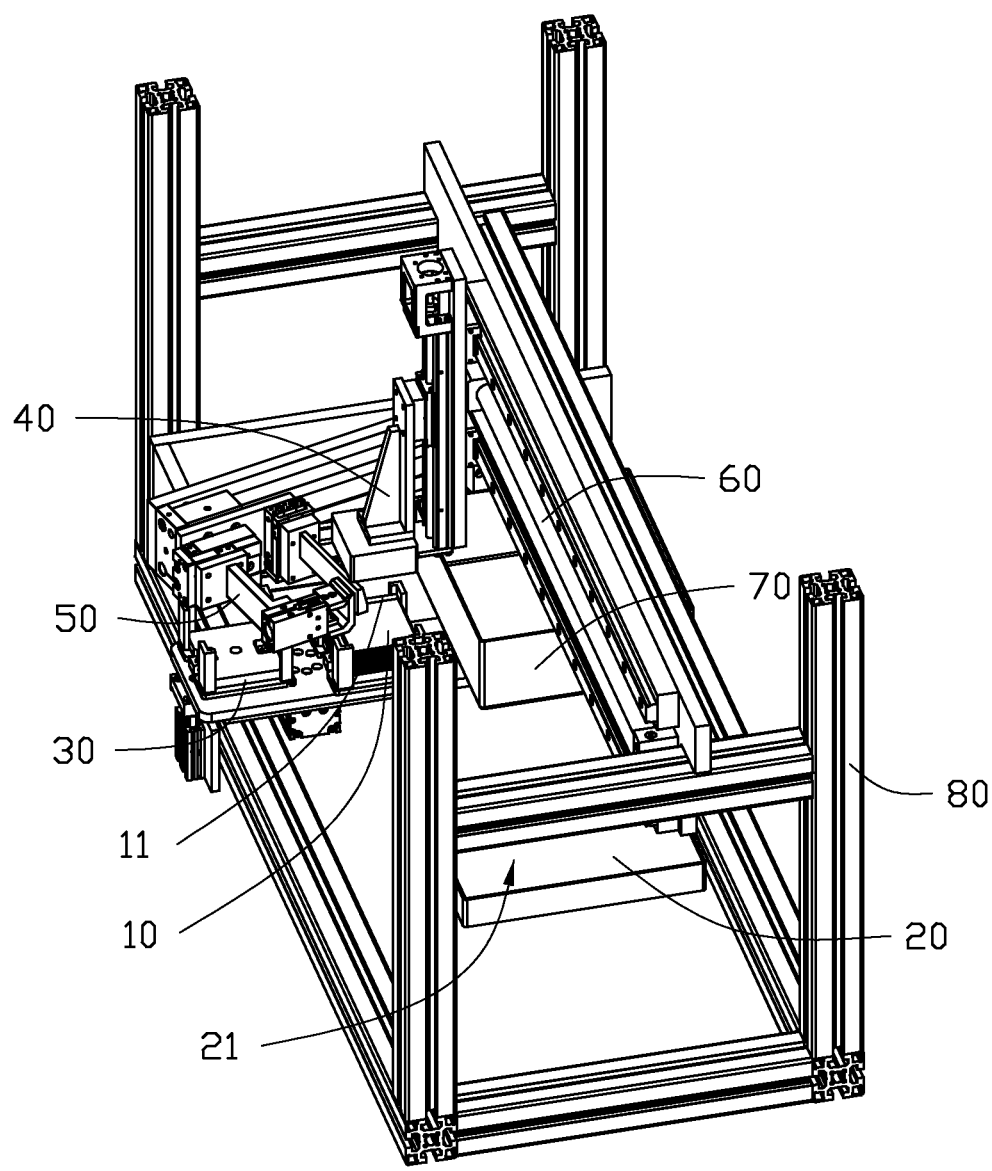
FIG. 1 is an isometric view showing a label affixing machine in accordance with an exemplary embodiment of the present disclosure.
Figure 2:
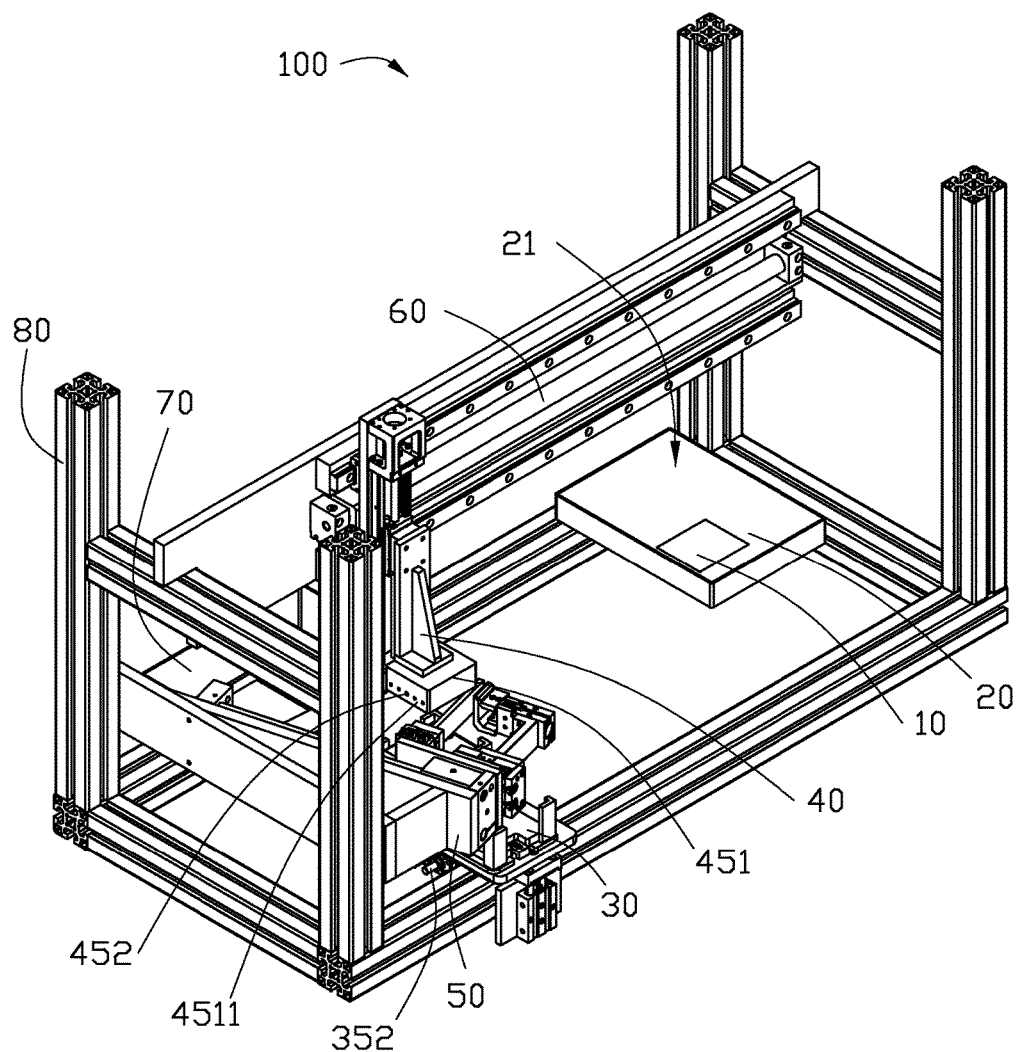
FIG. 2 is another isometric view of FIG. 1.
Figure 3:
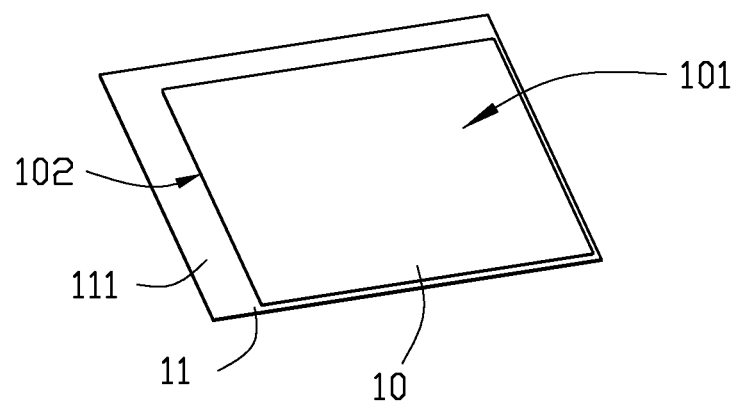
FIG. 3 is an isometric view showing a label affixed on a bottom board used in the label affixing machine of FIG. 1.

Referring to FIGS. 1-3, a label affixing machine 100 is configured to affix a label 10 on a surface 21 of an object 20.

The label 10 can detachably combine with a bottom board 11. The label 10 defines an upper surface 101 and a lower surface 102. The lower surface 102 faces the bottom board 11. The bottom board 11 is affixed to the upper surface 101 or the lower surface 102 of the label 10 by pasting or other ways. In this embodiment, the bottom board 11 can be affixed to the lower surface 102 of the label 10. The label 10 can include an adhesive layer (not shown) arranged at the lower surface 102. The bottom board 11 is affixed under the label 10 by the adhesive layer. An area of the bottom board 11 facing the lower surface 102 is larger than an area of the lower surface 102. A part of the bottom board 11 is exposed around the label 10 to form an operating portion 111.

The label affixing machine 100 can include a storing device 30, a picking device 40, a peeling device 50, a conveyer 60 and a holder 80. The storing device 30, the peeling device 50 and the conveyer 60 are fixed in position on the holder 80. The conveyer 60 is coupled to the picking device 40. A plurality of electrically controlled components, such as solenoid or electric motors (not shown) are electrically connected to the label affixing machine 100 for controlling and driving the storing device 30, the picking device 40, the peeling device 50 and the conveyer 60. A power supply (not shown) is electrically connected to the electrically controlled components.

In an initialization of the label affixing machine 100, a plurality of bottom boards 11 each carrying one of the labels 10 can be stacked in the storing device 30. The picking device 40 faces the label 10 for picking the label 10 with the bottom board 11. The peeling device 50 is configured to peel the bottom board 11 from the label 10 to expose the lower surface 102 of the label 10. The conveyer 60 is configured to move the picking device 40 with the label 10 to the object 20. The picking device 40 is configured to release the label 10 and affixes the label 10 to the surface 21 of the object 20.

Figure 4:
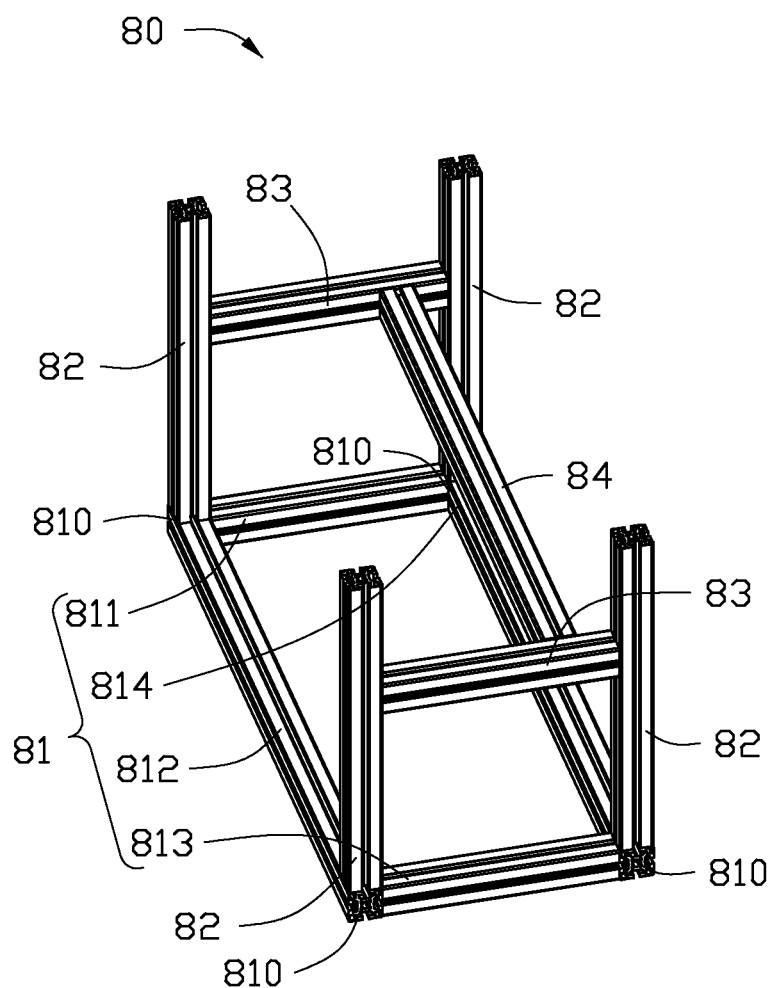
FIG. 4 is an isometric view showing a holder of the label affixing machine of FIG. 1.

Referring to FIG. 4, the holder 80 includes a base frame 81, a plurality of pillars 82, a plurality of cross rods 83 and a connecting rod 84. The base frame 81 can be a rectangular frame. The base frame 81 includes a first base rod 811, a second base rod 812, a third base rod 813 and a fourth base rod 814. The first base rod 811 is opposite to the third base rod 813. The second base rod 812 is opposite to the fourth base rod 814. The number of the pillars 82 can be four. The four pillars 82 are fixed in position on four corners 810 of the base frame 81, respectively. The number of the cross rods 83 can be two. One of the cross rods 83 is positioned upon the first base rod 811 and connected between two corresponding pillars 82. The other one of the cross rods 83 is positioned upon the third base rod 813 and connected between two corresponding pillars 82. The connecting rod 84 is bridged between the two cross rods 83. In at least one embodiment, the connecting rod 84 can be parallel to a plane where the base frame 81 located. The holder 80 can be a cubic frame.

Figure 5:
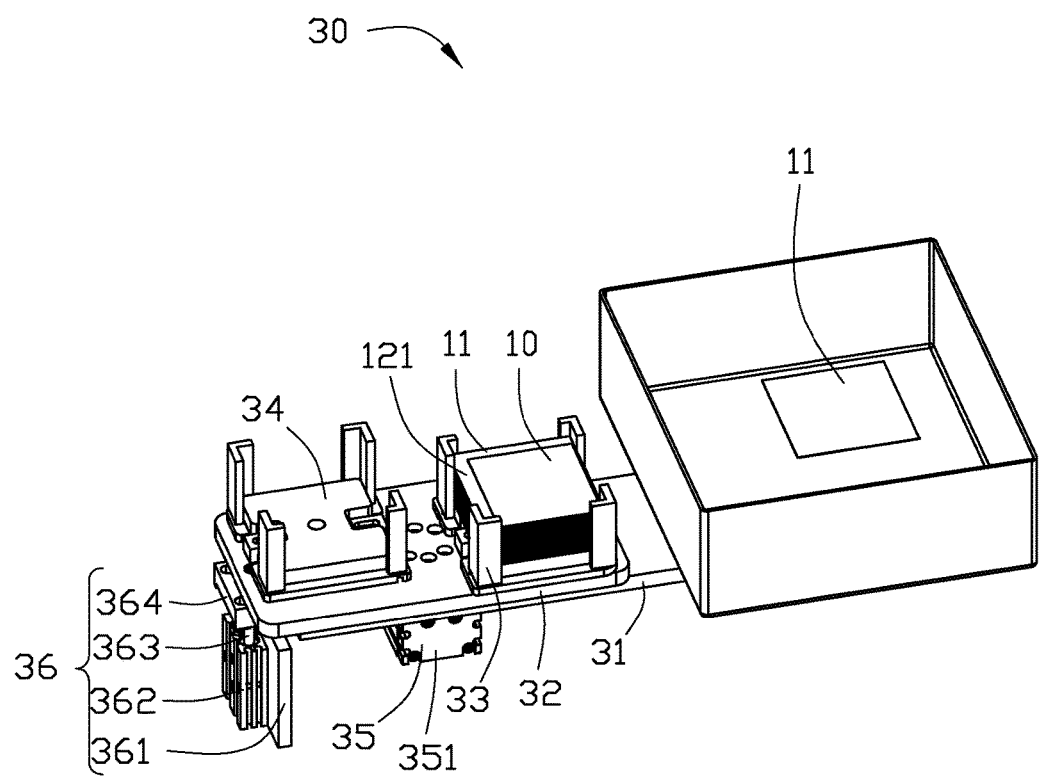
FIG. 5 is an isometric view showing a storing device of the label affixing machine of FIG. 1.

Referring to FIG. 5, the storing device 30 is configured for carrying the label 10. The storing device 30 can include a base 31, a carrying board 32, a first storing box 33, a first adjusting component 35 and a second adjusting component 36. The base 31 is fixed in position on the holder 80. The base 31 can be fixed in position on the base frame 81 of the holder 80 (shown in FIG. 4). Specially, the base 31 can be fixed in position on the second base rod 812 and the fourth base rod 814 (shown in FIG. 4). The carrying board 32 is carried on the base 31. The first storing box 33 is arranged on the carrying board 32. The first adjusting component 35 and the second adjusting component 36 are positioned under the carrying board 32. The second adjusting component 36 is configured to adjust a location of the carrying board 32 in a vertical direction. The second adjusting component 36 includes an installing board 361, a drive cylinder 362, an extendable rod 363 and a support board 364. The installing board 361 is fixed in position on the holder 80. The installing board 361 can be fixed in position on an outside of the second base rod 812. The drive cylinder 362 is fixed in position on the installing board 361. One end of the extendable rod 363 is extendably received in the drive cylinder 362, and the other one end of the extendable rod 363 is connected to the support board 364. The support board 364 abuts the carrying board 32. The drive cylinder 362 drives the extendable rod 363 to extend or retract, thereby moving the support board 364 in the vertical direction, thereby adjusting the location of the carrying board 32 in the vertical direction. The first adjusting component 35 adjusts the location of the carrying board 32 in a horizontal direction. The first adjusting component 35 is arranged under the base 31 and connected to the carrying board 32 by a connecting component (not shown). The first adjusting component 35 is similar to the second adjusting component 36 in configuration. The first adjusting component 35 includes an installing board (not shown), a drive cylinder 351 and an extendable rod 352 (shown in FIG. 2). The installing board is arranged under the base 31. The drive cylinder 351 is fixed in position under the installing board. A part of the extendable rod 352 is extendably received in the drive cylinder 351. The connecting component is connected between the extendable rod 352 and the carrying board 32. The drive cylinder 351 drives the extendable rod 352 to extend or retract, thereby moving the connecting component in the horizontal direction, thereby adjusting the location of the carrying board 32 in the horizontal direction.

The storing device 30 can further include a second storing box 34. The second storing box 34 is carried on the carrying board 32. The second storing box 34 is adjacent to the first storing box 33. The first storing box 33 and the second storing box 34 are able to be exchanged locations with each other. When the first storing box 34 is empty, the second storing box 34 with labels 10 can be interchangeable mounted where the first storing box 33 is located.

Figure 6:
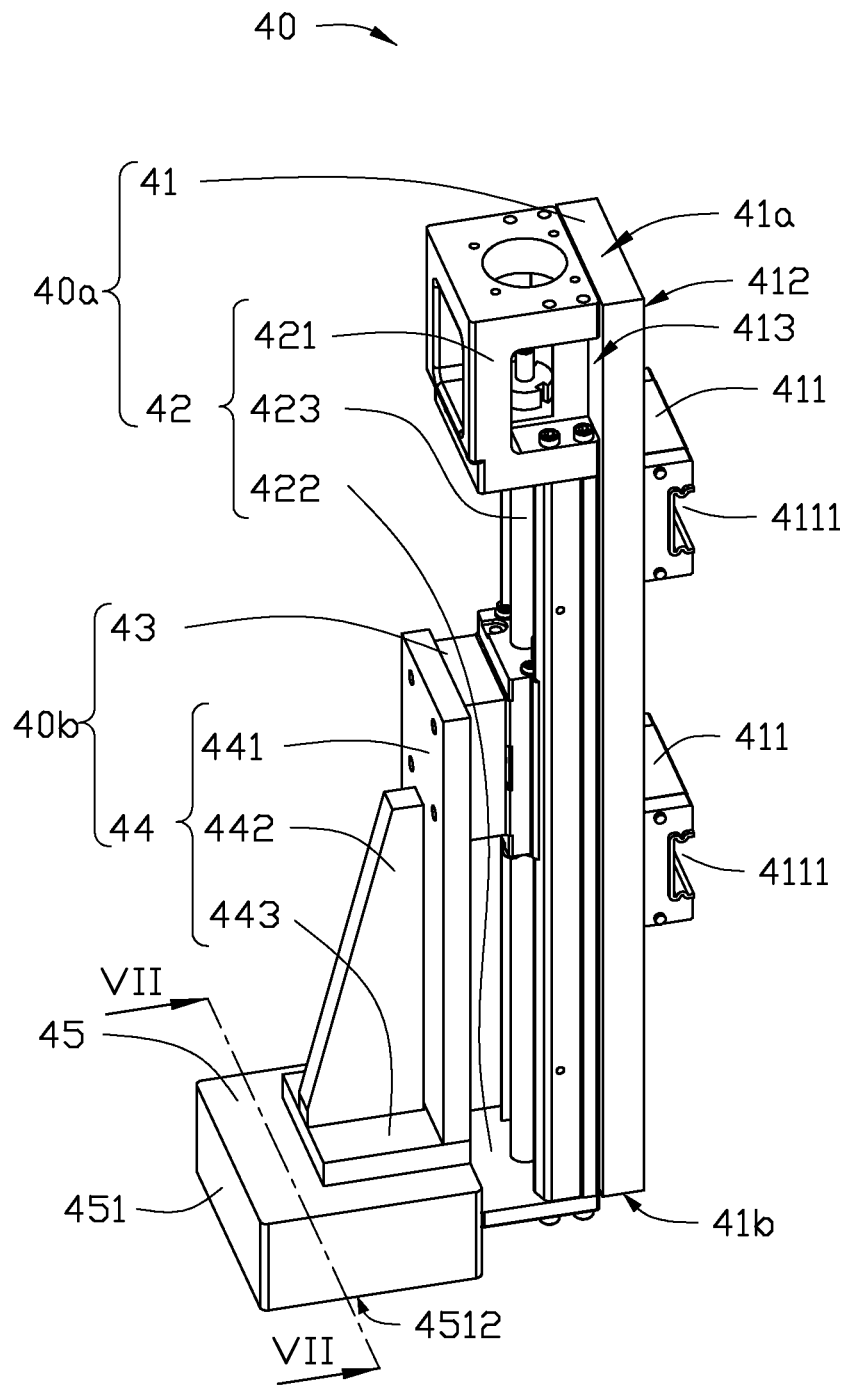
FIG. 6 is an isometric view showing a picking device of the label affixing machine of FIG. 1.

Referring to FIG. 6, the picking device 40 includes a first fixing module 40*a*, a first moving module 40*b* driven by the driving motor (not shown) and a picking component 45. The first fixing module 40*a* is coupled to the conveyer 60. The first moving module 40*b* is coupled to the first fixing module 40*a*. The first moving module 40*b* driven by the driving motor (not shown) moves the picking component 45 in a vertical direction.

The first fixing module 40*a* includes a first fixing board 41 and a first fixing component 42. The first fixing board 41 is coupled to the conveyer 60. The first fixing board 41 defines a front surface 413 and a back surface 412 opposite to the front surface 413. The first fixing component 42 is fixed in position on the front surface 413 of the first fixing board 41. The back surface 413 faces the conveyer 60. The first fixing component 42 includes a first head 421, a first tail-end 422 and a first shaft 423. The first head 421 and the first tail-end 422 are respectively fixed in position on a top end 41*a* and a bottom end 41*b* of the first fixing board 41. The first shaft 423 is connected between the first head 421 and the first tail-end 422.

The first moving module 40*b* includes a first moving component 43 driven by the driving motor (not shown) and a first combining component 44. The first moving component 43 is coupled to the first shaft 423. The first moving component 43 driven by the driving motor (not shown) moves between the first head 421 and the first tail-end 422 along the first shaft 423. The first moving component 43 moves in the vertical direction. The first combining component 44 is fixed in position on the first moving component 43. The first moving component 43 moves the first combining component 44 in the vertical direction. The first combining component 44 includes a vertical board 441, a connecting board 442 and a horizontal board 443. The vertical board 441 is fixed in position on the first moving component 43. The horizontal board 443 is perpendicular to the vertical board 441. The connecting board 442 is fixed and connected the vertical board 441 and the horizontal board 443.

Figure 7:
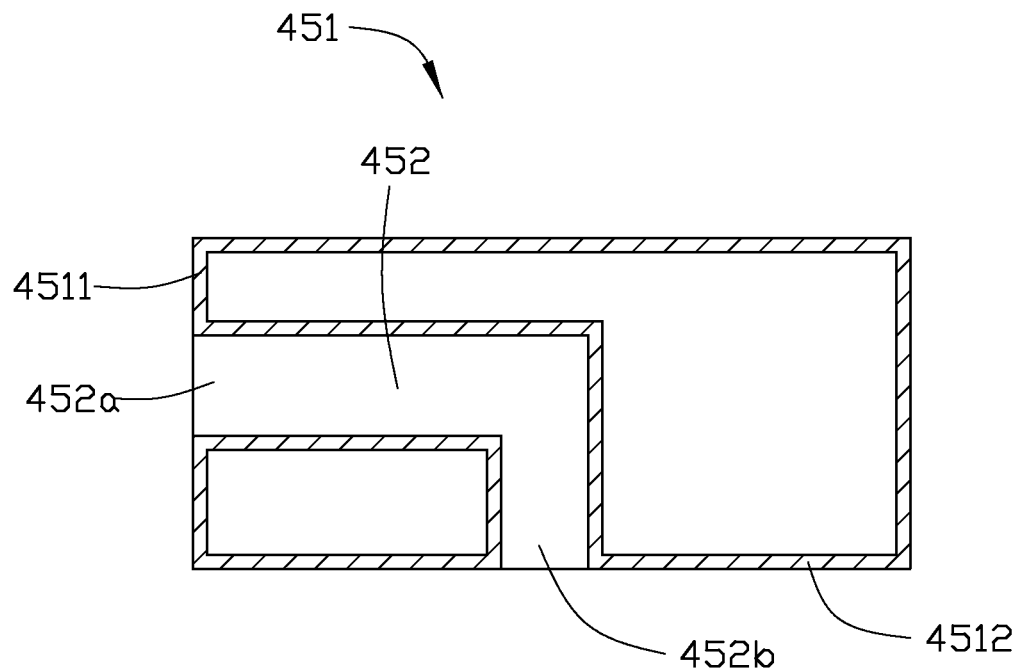
FIG. 7 is a cross-sectional schematic along VII-VII of a pump of FIG. 6.

The picking component 45 is fixed in position on the first combining component 44 of the first moving module 40*b*. The picking component 45 is fixed in position under the horizontal board 443 of the first combining component 44 and positioned upon the storing device 30. Referring to FIGS. 2, 6 and 7, the picking component 45 includes a pump 451 to create vacuum. A plurality of air channels 452 are formed in the pump 451. Each air channel 452 is connected between an inlet/outlet 452*a* in a sidewall 4511 and an inlet/out 452*b* in a bottom wall 4512. The pump 451 driven by a motor (not shown) is able to exhaust air from or absorb air to a space between the label 10 and the picking component 45 through the air channel 452 and inlet/outlets 452*a*, 452*b*. The picking component 45 holds the label 10 when air between the label 10 and the picking component 45 is evacuated by the pump 451 through the inlet/out 452*b*, the air channels 452, and then outside through the inlet/out 452*a*, thereby picking up the label 10. In reverse, the pump 451 of pick component 45 pumps air through inlet 452*a*, then the air channels 452, then the inlet/out 452*b*, and into the space between the label 10 and the picking component 45, thereby releasing the label 10.

Further, the first fixing board 41 can include two fasteners 411. The fasteners 411 can be fixed in position on the back surface 412 of the first fixing board 41. A slot 4111 can be defined on each of the two fasteners 411.

Figure 8:
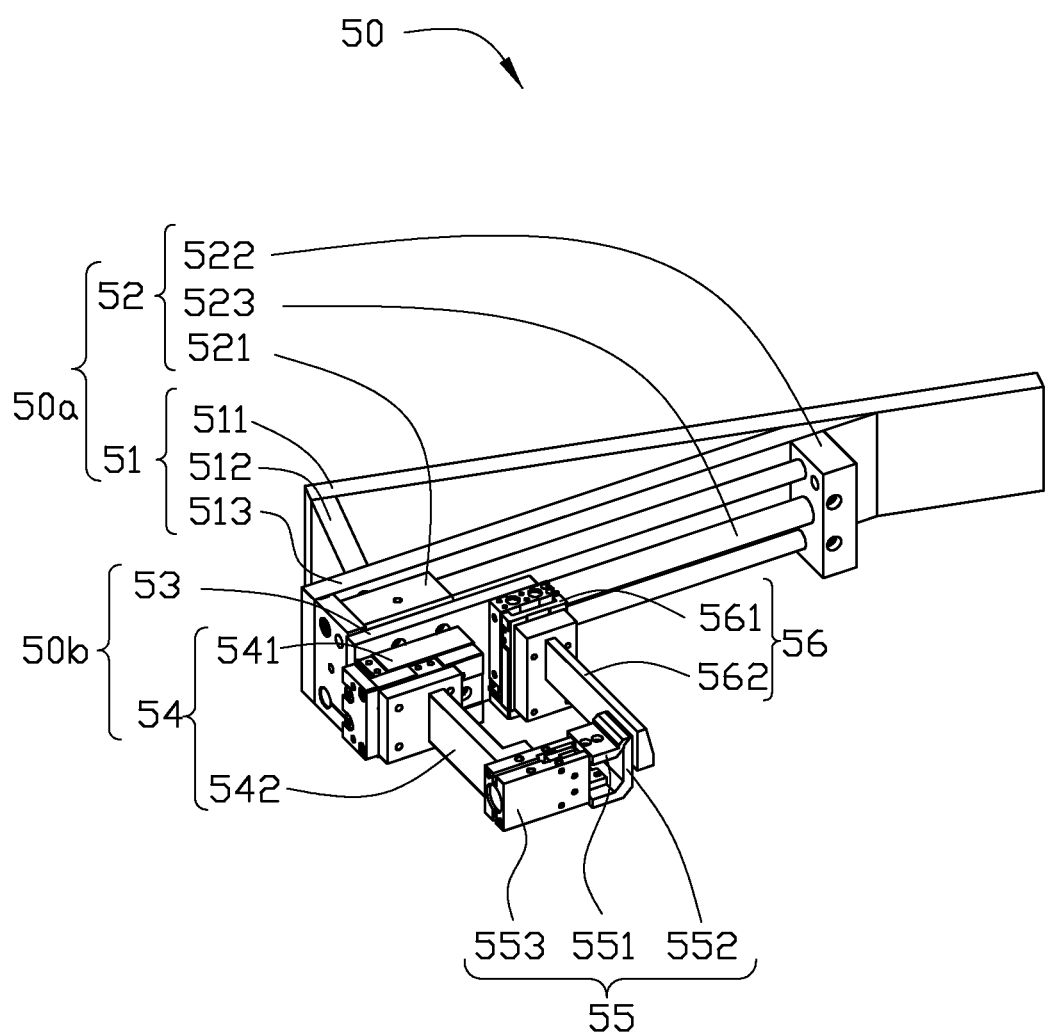
FIG. 8 is an isometric view showing a peeling device of the label affixing machine of FIG. 1.

Referring to FIG. 8, the peeling device 50 includes a second fixing module 50*a*, a second moving module 50*b* driven by the driving motor (not shown) and a robotic arm 55. The second fixing module 50*a* is fixed in position on the holder 80. The robotic arm 55 is configured for clamping the bottom board 11 of the label 10. The robotic arm 55 can be used to clamp the operating portion 111 of the bottom board 11. The second moving module 50*b* is coupled to the second fixing module 50*a*. The robotic arm 55 is fixed in position on the second moving module 50*b* and is configured to be moved by second moving module 50*b*, thereby peeling the bottom board 11 from the label 10.

The second fixing module 50*a* includes a second fixing frame 51 fixed in position on the holder 80 and a second fixing component 52 fixed in position on the second fixing frame 51. The second fixing frame 51 includes a first arranging board 511, a second arranging board 512 and a third arranging board 513. The first arranging board 511, the second arranging board 512 and the third arranging board 513 frame to a right-angled triangle. The first arranging board 511 is perpendicular to the second arranging board 512. The third arranging board 513 is a hypotenuse. The first arranging board 511 is bridged between two pillars 82, which are located on the two vertexes 810 of the first base rod 811. In this embodiment, the first arranging board 511 is parallel to the first base rod 811. The second arranging board 512 is upon the second base rod 812. The second arranging board 512 is parallel to the second base rod 812. The second fixing component 52 is fixed in position on the third arranging board 513 and positioned out of the right-angled triangle framed by the first arranging board 511, the second arranging board 512 and the third arranging board 513. The second fixing component 52 includes a second head 521, a second tail-end 522 and a second shaft 523. The second head 521 is near the second base rod 812. The second tail-end 522 is near the first base rod 811. The second shaft 523 is connected between the second head 521 and second tail-end 522.

The second moving module 50b includes a second moving component 53 driven by the driving motor (not shown) and a second combining component 54. The second moving component 53 is coupled to the second shaft 523. The second moving component 53 driven by the driving motor (not shown) moves between the second head 521 and the second tail-end 522 along the second shaft 523. The second combining component 54 is fixed in position on the second moving component 53 and near the second head 521. The second combining component 54 includes a first portion 541 and a second portion 542 fixed in position on the first portion 541.

The robotic arm 55 is fixed in position on the second portion 542 of the second combining component 54. Referring to FIG. 2, the robotic arm 55 is shown moved into position between 45 and 30. When the robotic arm 55 is moved out of this position, the picking component 45 faces the first storing box 33 of the storing device 30. The robotic arm 55 includes a first finger 551, a second finger 552 and a controlling portion 553. The controlling portion 553 is fixed in position on the second portion 542 of the second combining component 54. The controlling portion 553 controls the first finger 551 and the second finger 552 to clamp or separate. In use, the controlling portion 553 controls the first finger 551 and the second finger 552 to clamp the operating portion 111 of the bottom board 11, and then the second moving component 52 moves the second combining component 54 from the second head 521 to the second tail-end 522 along the second shaft 523, thereby peeling the bottom board 11 from the label 10. And then the controlling portion 553 controls the first finger 551 and the second finger 552 to separate with each other, thereby dropping the bottom board 11, and then the second moving component 52 moves the second combining component 54 from the second tail-end 522 back to the second head 521 along the second shaft 523.

Further, the peeling device 50 can include an assist 56. The assist 56 is fixed in position on the second moving module 50b. The assist 56 can be fixed in position on the second moving component 53 and near the second tail-end 522. The assist 56 includes a moving element 561 and an operating arm 562. In use, the moving element 561 driven by the driving motor (not shown) moves the operating arm 562 in a vertical direction. The moving element 561 moves the operating arm 562 upward to attach the bottom board 11 of the label 10. Te controlling portion 553 controls the first finger 551 and the second finger 552 to clamp the operating portion 111 of the bottom board 11, while the moving element 561 moves the operating arm 562 upward to attach the bottom board 11 of the label 10, and then the second moving component 53 moves the second combining component 54 with the robotic arm 55 and the assist 56 from the second head 521 to the second tail-end 522 along the second shaft 523, thereby peeling the bottom board 11 form the label 10. When the bottom board 11 have been peeled from the label 10, the moving element 561 moves the operating arm 562 down, while the controlling portion 553 controls the first finger 551 and the second finger 552 to separate with each other, thereby dropping the bottom board 11, and then the second moving component 53 moves the second combining component 54 with the robotic arm 55 and the assist 56 from the second tail-end 522 back to the second head 521 along the second shaft 523.

Figure 9:
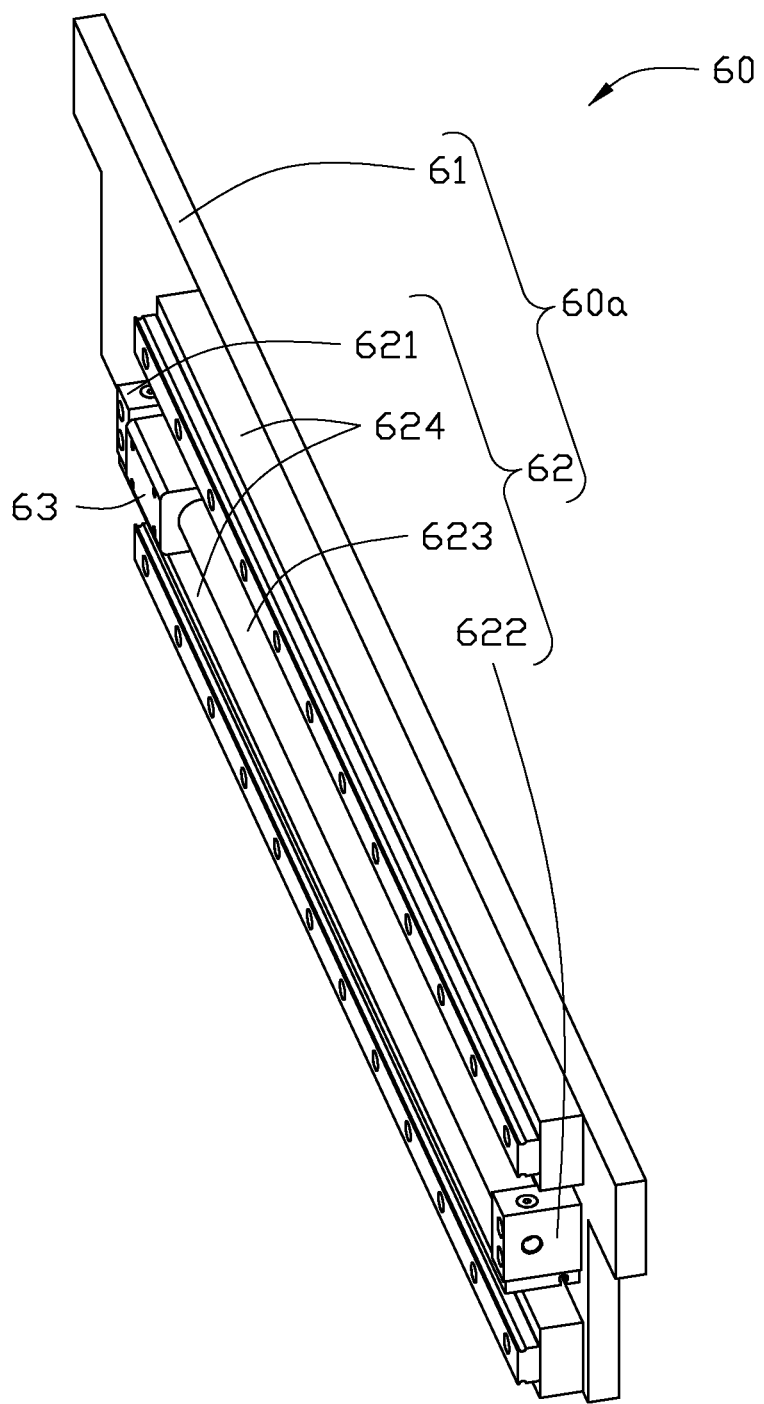
FIG. 9 is an isometric view showing a conveyer of the label affixing machine of FIG. 1.

Referring to FIG. 9, the conveyer 60 is coupled to the first fixing module 40a of the picking device 40. The conveyer 60 includes a third fixing module 60a fixed in position on the holder 80 and a third moving component 63 coupled to the third fixing module 60a. The third fixing module 60a can be fixed in position on the connecting rod 84 of the holder 80. The picking device 40 is fixed in position on the third moving component 63. The third moving component 63 driven by the driving motor (not shown) moves the picking device 40.

The third fixing module 60a includes a third fixing board 61 fixed in position on the holder 80 and a third fixing component 62 fixed in position on the third fixing board 61. The third fixing board 61 can be fixed in position on the connecting rod 84 of the holder 80. A plane where the third fixing board 61 is located is perpendicular to a plane where the base frame 81 of the holder 80 is located. The third fixing component 62 includes a third head 621, a third tail-end 622 and a third shaft 623. The third head 621 is fixed in position on the third fixing board 61 and near the first base rod 811. The third tail-end 622 is fixed in position on the third fixing board 61 and near the third base rod 813. The third shaft 623 is connected between the third head 621 and the third tail-end 622. The third moving component 63 is coupled to the third shaft 623. The third moving component 63 moves between the third head 621 and the third tail-end 622 along the third shaft 623. The first fixing board 41 of the picking device 40 is fixed in position on the third moving component 63.

Further, the third fixing component 62 of the conveyer 60 can include two tracks 624. The two tracks 624 are parallel to the third shaft 623. The two tracks 624 can be respectively coupled to the two slots 4111 of the two fasteners 411 fixed in position on the back surface 412 of the first fixing board 41. The two slots 4111 each engaged one of the two tracks 624, respectively. The two slots 4111 can move between the third head 621 and the third tail-end 622 along the two conveyers 60, respectively.

Furthermore, the label affixing machine 100 can include a collecting device 70 (shown in FIG. 5). The collecting device 70 is fixed in position on the base 31. The collecting device 70 is positioned under the peeling device 50. Further, the collecting device 70 can be positioned under the second tail-end 522 of the peeling device 50.

A preparing process of the label affixing machine 100 is as follows:

adjusting the label affixing machine 100 to being an initialization;

stacking the labels 10 in the first storing box 33;

adjusting the first adjusting component 35 and the second adjusting component 36 to make the first storing box 33 to face the picking component 45.

The initialization of the affixing machine 100 can be set as following: the first moving component 43 of the picking device 40 is located at the first head 421 of the first fixing component 42, the second moving component 53 of the peeling device 50 is located at the second head 521 of the second fixing component 52, the picking device 40 is located at the third head 621 of the third fixing component 62 of conveyer 60, and the operating arm 562 of the assist 56 is located at a bottom of the moving element 561.

The label 10 faces the picking component 45 of the picking device 40. The bottom board 11 faces the carrying board 32.

A working process of the label affixing machine 100 is as follows:

The first moving component 43 of the picking device 40 moves from the first head 421 of the first fixing component 42 to the first tail-end 422. The picking component 45 attaches the label 10. Air being between the label 10 and the picking component 45 are exhausted by the pump 451 through the air channels 452, then the picking component 45 picks the label 10 with the bottom board 11 affixed under the label 10. The picking component 45 with the label 10 moves from the first tail-end 422 back to the first head 421.

The second moving component 53 of the peeling device 50 moves from the second head 521 of the second fixing component 52 to the second tail-end 522, thereby making the robotic arm 55 close to the picking component 45 of the picking device 40 with the label 10. The controlling portion 553 controls the first finger 551 and the second finger 552 to clamp the operating portion 111 of the bottom board 11. The assist 56 can move upward to attach the bottom board 11. The second moving component 53 moves the second combining component 54 to the second head 521 continually, thereby the robotic arm 55 or the robotic arm 55 together with the assist 56 peels the bottom board 11 from the label 10. When the robotic arm 55 with the bottom board 11 moves and is positioned upon the collecting device 70, the controlling portion 553 controls the first finger 551 and the second finger 552 to separate with each other, thereby dropping the bottom board 11 to the collecting device 70. The peeling device 50 moves back to the second head 521. The moving element 561 of the assist 56 can move the operating arm 562 back to the bottom of the moving element 561.

The picking device 40 moves from the third head 621 of the third fixing component 62 of the conveyer 60 to the third tail-end 622 and stops upon the object 20. The picking component 45 of the picking device 40 moves to the first tail-end 422 and makes the label 10 attach the object 20. The pick component 45 absorbs air to the space between the label 10 and the picking component 45 by the pump 451 through the air channels 45, and releases the label 10, and then makes the label 10 to be affixed on the object 20.

After the label 10 affixed on the object 20, the picking device 40, the peeling device 50 and the conveyer 60 come back to the initialization.

Above working process is used for one label 10, if for a plurality of labels 10, the above working process needs to be repeat.

The embodiments shown and described above are only examples. Many details are often found in the art such as the other features of a label affixing machine. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A label affixing machine for removing a bottom board where a label affixed and affixing the label on an object, the label affixing machine comprising:
    a holder;
    a storing device fixed in position on the holder, the storing device configured for carrying the label affixed on one bottom board;
    a picking device comprising a first fixing module, a first moving module coupled to the first fixing module and a picking module fixed in position on the first moving module, wherein the picking module is moved by the first moving module, the picking module is configured for selecting and picking the label;
    a peeling device fixed in position on the holder, the peeling device comprising a second fixing module fixed in position on the holder, a second moving module coupled to the second fixing module and a robotic arm fixed in position on the second moving module, wherein the robotic arm is moved by the second moving module and is configured for clamping the bottom board and peeling the bottom board from the label; and
    a conveyer coupled to the first fixing module of the picking device, and the conveyer moving the picking device.

2. The label affixing machine of claim 1, wherein the storing device comprises a base, a carrying board, a first storing box, a first adjusting component and a second adjusting component, the base is fixed in position on the holder, the carrying board is carried on the base, the first storing box is carried on the carrying board, and the first adjusting component and the second adjusting component are positioned under the carrying board.

3. The label affixing machine of claim 2, wherein the first adjusting component adjusts a location of the carrying board in a horizontal direction.

4. The label affixing machine of claim 2, wherein the second adjusting component adjusts the location of the carrying board in a vertical direction.

5. The label affixing machine of claim 2, wherein the storing device further comprises a second storing box, the second storing box is carried on the carrying board, the second storing box is adjacent to the first storing box, and the first storing box and the second storing box are able to be exchanged with each other.

6. The label affixing machine of claim 1, wherein the first fixing module comprises a first fixing board and a first fixing component fixed in position on the first fixing board, and the first fixing board is coupled to the conveyer.

7. The label affixing machine of claim 6, wherein the first fixing board defines a front surface and a back surface opposite to the front surface, the back surface faces the conveyer, and the first fixing component is fixed in position on the front surface of the first fixing board.

8. The label affixing machine of claim 7, wherein the first fixing board comprises two fasteners, the fasteners are fixed in position on the back surface of the first fixing board, and a slot is defined on each of the two fasteners.

9. The label affixing machine of claim 6, wherein the first fixing component comprises a first head, a first tail-end and a first shaft, the first head and the first tail-end are respectively fixed in position on a top end and a bottom end of the first fixing board, and the first shaft is connected between the first head and the first tail-end, one end of the first shaft is connected to the first head, and the other end of the first shaft is connected to the first tail-end.

10. The label affixing machine of claim 9, wherein the first moving module includes a first moving component and a first combining component fixed in position on the first moving component, the first moving component is coupled to the first shaft of the first fixing component, the first moving component moves the first combining component between the first head and the first tail-end along the first shaft in the vertical direction.

11. The label affixing machine of claim 10, wherein the picking module is fixed in position on the first combining component, and the picking module comprises a pump with a plurality of air channels.

12. The label affixing machine of claim 6, wherein the second fixing module comprises a second fixing frame fixed in position on the holder and a second fixing component fixed in position on the second fixing frame.

13. The label affixing machine of claim 12, wherein the second fixing component comprises a second head, a second tail-end and a second shaft, and the second shaft is connected between the second head and second tail-end, one end of the second shaft is connected to the second head, and the other end of the second shaft is connected to the second tail-end.

14. The label affixing machine of claim 13, wherein the second moving module comprises a second moving component and a second combining component, the second moving component is coupled to the second shaft, and the second moving component moves between the second head and the second tail-end along the second shaft.

15. The label affixing machine of claim 14, wherein the robotic arm comprises a first finger, a second finger and a controlling portion, the controlling portion is fixed in position on the second combining component, and the controlling portion controls the first finger and the second finger to clamp or separate.

16. The label affixing machine of claim 14, wherein the peeling device further comprises an assist, the assist is fixed in position on the second moving module, the assist comprises a moving element and an operating arm, and the moving element moves the operating arm in a vertical motion.

17. The label affixing machine of claim 6, wherein the conveyer comprises a third fixing module fixed in position on the holder and a third moving component coupled to the third fixing module, the picking device is fixed in position on the third moving component, and the third moving component moves the picking device.

18. The label affixing machine of claim 17, wherein the third fixing module comprises a third fixing board fixed in position on the holder and a third fixing component fixed in position on the third fixing board, the third fixing component comprises a third head, a third tail-end and a third shaft, the third shaft is connected between the third head and the third tail-end, the third moving component is coupled to the third shaft, the third moving component moves between the third head and the third tail-end along the third shaft, one end of the third shaft is connected to the third head, and the other end of the third shaft is connected to the third tail-end, and the first fixing board of the picking device is fixed in position on the third moving component.

19. The label affixing machine of claim 18, wherein the third fixing component of the conveyer further comprises two tracks, and the two tracks are parallel to the third shaft.

20. The label affixing machine of claim 1 further comprising a collecting device, wherein the collecting device is fixed in position on the base and positioned under the peeling device.

* * * * *